P. SHAMPOU & I. DONAHUE.
ADJUSTING MEANS FOR FEED SCREWS.
APPLICATION FILED APR. 22, 1909.

959,810.

Patented May 31, 1910.

Witnesses
James F. Crown
E. M. Ricketts

Inventor
Peter Shampou
Isaac Donahue
By Watson E. Coleman
Attorney

UNITED STATES PATENT OFFICE.

PETER SHAMPOU AND ISAAC DONAHUE, OF WEBSTERVILLE, VERMONT, ASSIGNORS OF ONE-THIRD TO JOSEPH BEDARD, OF WEBSTERVILLE, VERMONT.

ADJUSTING MEANS FOR FEED-SCREWS.

959,810.  Specification of Letters Patent.  Patented May 31, 1910.

Application filed April 22, 1909. Serial No. 491,465.

*To all whom it may concern:*

Be it known that we, PETER SHAMPOU, a citizen of the Dominion of Canada, and ISAAC DONAHUE, a citizen of the United States, both residing at Websterville, in the county of Washington and State of Vermont, have invented certain new and useful Improvements in Adjusting Means for Feed-Screws, of which the following is a specification, reference being had to the accompanying drawings.

This invention relates to improvements in adjusting means for the feed screws of mining drills and other machines.

The object of the invention is to provide a simple and practical device which may be readily applied to any of the rock or mining drills now in common use for the purpose of taking up the wear of the feed screw and nut and thereby prevent all lost motion and insuring a proper and effective operation of the drill.

With the above and other objects in view, the invention consists of the novel features of construction and the combination and arrangement of parts hereinafter fully described and claimed, and illustrated in the accompanying drawings, in which—

Figure 1:
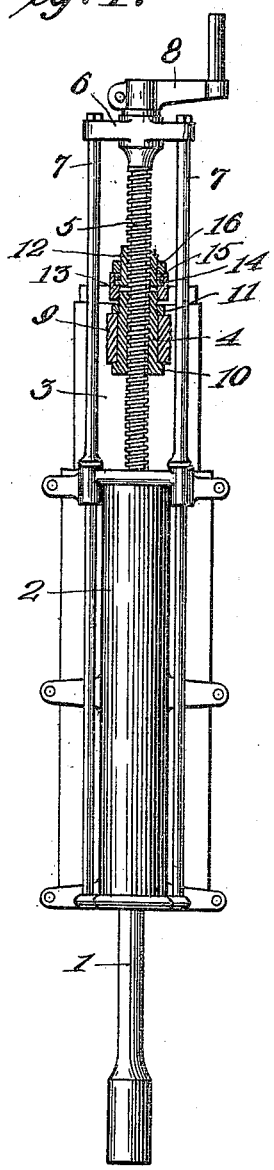
Figure 2:
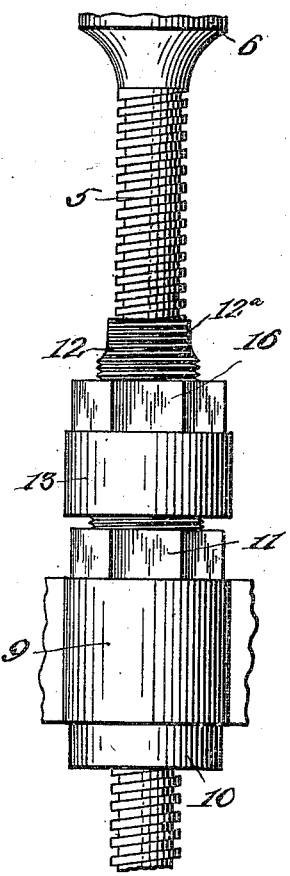
Figure 3:
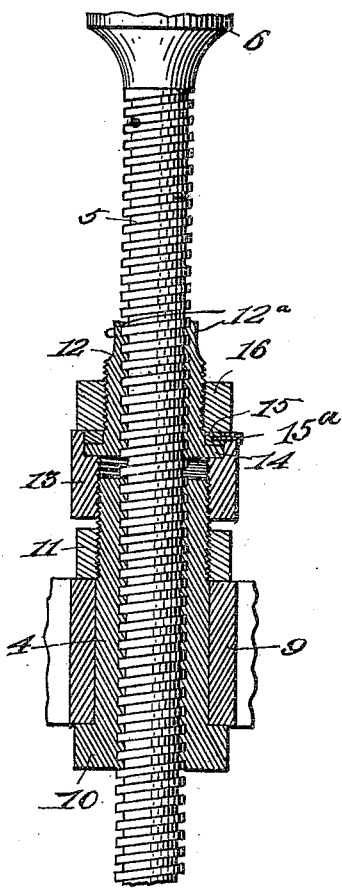

Figure 1 is a view, partly in elevation and partly in section, showing the invention applied to a well known form of mining drill; Fig. 2 is a side elevation of the feed nut of a drill with the invention applied thereto, a portion of the feed screw being also shown; and Fig. 3 is a longitudinal section through the parts shown in Fig. 2.

In the drawings 1 denotes a rock or mining drill of well known form having a support 2, a slidably mounted member 3 carrying the drill and a feed nut 4 which works on a feed screw 5 mounted in any suitable manner in a cross bar 6 between two rods 7 projecting from the support 2 and having a crank handle 8 at its rear end. The nut 4 is in the form of a sleeve fixed in a lug 9 formed upon the slide 3, said sleeve nut being retained in the lug by forming upon one end of the sleeve nut an annular flange 10 and externally screw threading its other end for the reception of a retaining nut 11. The parts above described are old and well known and form no part of the present invention.

Our invention is adapted to be applied to the parts above described after the nut and feed screw have become worn and there is lost motion at said parts in the operation of the drill.

The invention comprises a supplemental feed nut 12 internally threaded to receive the feed screw 5, and suitable means for adjustably securing it to the nut 4 or other portion of the slide 3. The preferred form of attaching and adjusting means for the supplemental feed nut is clearly shown in Figs. 2 and 3 of the drawings and comprises a sleeve nut 13 having a swiveled connection with the nut 12 and a threaded engagement with the threaded end of the nut 4. The swiveled connection between the nut 12 and sleeve 13 is effected by forming the former with an outwardly projecting annular flange 14 which is arranged in the sleeve 13 and engages an inwardly projecting annular flange 15 in the form of a ring secured by screws 15ª in the end of said sleeve. The nut 12 is externally screw threaded for the reception of a locking nut 16, which latter is screwed against the end of the sleeve 13 to prevent rotation of the nut 12. It will be seen that by adjusting said parts the nut 12 may be moved toward the nut 4 so as to take up wear on the latter and the feed screw and prevent any lost motion due to such wear. To permit the nut 12 to be readily turned its outer portion is preferably formed at opposite points with flat faces 12ª for the reception of the jaws of a wrench or similar tool.

From the foregoing it will be seen that the invention provides an exceedingly simple and practical device of this character which may be applied to any rock or mining drill employing a feed screw or nut and by means of which the wear on said parts may be quickly taken up to prevent looseness or lost motion and the resulting lack of efficiency in the operation of the drill.

Having thus described the invention what is claimed is:

1. The combination of a feed screw and its nut, the latter having an externally screw threaded portion at one end, a supplemental nut engaged with the screw and having an externally screw threaded portion, a sleeve nut having a swiveled connection with said supplemental nut, and having its internal screw threads engaged with the external screw threads on the end of the first mentioned nut, and a clamping nut engaged with the external screw threads of said supplemental nut for locking said swiveled connection.

2. The combination of a feed screw and its nut, the latter having an externally screw threaded portion at one end, a supplemental nut formed at one end with an annular outwardly projecting flange, at its other end with flat faced portions, and on its intermediate portion with external screw threads, a sleeve nut internally threaded to engage the threaded end of the first mentioned nut, said sleeve nut being formed at one end with a concentric recess to receive the flange of the supplemental nut, a ring secured in said recess of the sleeve nut, and a clamping nut engaged with the external screw threads of the supplemental nut to frictionally lock said sleeve and supplemental ends.

In testimony whereof we hereunto affix our signatures in the presence of two witnesses.

PETER SHAMPOU.
ISAAC DONAHUE.

Witnesses:
EARL H. DICKEY,
MARION L. DICKEY.